(12) United States Patent
Skov

(10) Patent No.: US 6,808,674 B1
(45) Date of Patent: Oct. 26, 2004

(54) ENCLOSED AREA ON A BLOW MOLDED ARTICLE AND METHOD OF MAKING THE SAME

(75) Inventor: Erik L. Skov, Akron, OH (US)

(73) Assignee: Rubbermaid Incorporated, Wooster, OH (US)

(*) Notice: Subject to any disclaimer, the term of this patent is extended or adjusted under 35 U.S.C. 154(b) by 312 days.

(21) Appl. No.: 09/824,503

(22) Filed: Apr. 2, 2001

(51) Int. Cl.[7] ............................................. B29C 49/20
(52) U.S. Cl. ..................... 264/516; 264/540; 264/571; 264/536
(58) Field of Search ................. 264/536, 540, 264/571, 516

(56) References Cited

U.S. PATENT DOCUMENTS

| | | | |
|---|---|---|---|
| 3,584,669 A | 6/1971 | Cooley | 152/52 |
| 3,743,467 A | 7/1973 | Lopez | 425/387 |

(List continued on next page.)

FOREIGN PATENT DOCUMENTS

| | | |
|---|---|---|
| DE | 0351689 | 1/1991 |
| DE | 0330931 B1 | 4/1994 |
| EP | WO 84/04949 | 12/1984 |
| EP | WO 9962728 | 12/1999 |
| FR | 1 491 546 A | 8/1967 |
| FR | 2 371 346 A | 6/1978 |
| FR | 0412864 B1 | 7/1990 |
| IT | 0418532 B1 | 4/1994 |
| IT | 0417466 B1 | 10/1995 |
| JP | 57087934 | 6/1982 |
| JP | 6035605 | 2/1994 |

OTHER PUBLICATIONS

Patent Abstracts of Japan vol. 018, No. 258 (M–1606), May 17, 1994 and JP 06 039908 A (Nissan Motor Co Ltd) Feb. 15, 1994.
Patent Abstracts of Japan vol. 2000, No. 05, Sep. 14, 2000 and JP 2000 043133 A (Mitsubishi Kagaku Form Plastic KK) Feb. 15, 2000.
English language abstract for French language document 2 371 346 A.
English language abstract for French language document 1 491 546 A.

Primary Examiner—Suzanne E. McDowell
(74) Attorney, Agent, or Firm—Marshall, Gerstein & Borun LLP

(57) ABSTRACT

A blow molded article is disclosed. The blow molded article includes a body defining a cavity, and a wall integrally-formed with the body and defining at least in part, an enclosure. A method of making a blow molded article is also disclosed. The method comprises supplying a preform to a mold having a first cavity and a second cavity, the first cavity having a pin, closing the mold, supplying a fluid to the closed mold, expanding a first portion and a second portion of the preform around the pin, and contacting the first portion and the second portion to provide the enclosure.

13 Claims, 3 Drawing Sheets

U.S. PATENT DOCUMENTS

| | | | |
|---|---|---|---|
| 3,821,344 A | 6/1974 | Peters | 264/94 |
| 3,828,969 A * | 8/1974 | Schurman | 220/324 |
| 3,888,187 A | 6/1975 | Van Moss, Jr. | 105/224.1 |
| 3,928,522 A | 12/1975 | Farrell | 264/89 |
| 3,939,236 A | 2/1976 | Hahn | 264/53 |
| 4,048,466 A | 9/1977 | Toth et al. | 219/121 EM |
| 4,070,429 A | 1/1978 | Uhlig | 264/89 |
| 4,101,244 A | 7/1978 | Grotberg | 416/41 |
| 4,132,433 A | 1/1979 | Willetts | 280/712 |
| 4,439,393 A | 3/1984 | Saito et al. | 264/532 |
| 4,497,521 A | 2/1985 | Lowery | 301/106 |
| 4,519,590 A | 5/1985 | Wells | 267/52 |
| 4,639,581 A | 1/1987 | Berger et al. | 235/101 |
| 4,802,876 A | 2/1989 | Bertrand | 446/95 |
| 4,874,649 A | 10/1989 | Daubenbüchel et al. | 428/36.5 |
| 4,969,813 A | 11/1990 | Lee et al. | 425/503 |
| 5,088,750 A | 2/1992 | Beese et al. | 280/47.26 |
| 5,217,136 A | 6/1993 | Sanden, Jr. | 220/337 |
| 5,261,562 A | 11/1993 | Prout et al. | 220/771 |
| 5,288,453 A * | 2/1994 | Rutenbeck et al. | 264/531 |
| 5,383,716 A | 1/1995 | Stewart et al. | 301/124.2 |
| 5,421,441 A | 6/1995 | Mason | 193/35 R |
| 5,444,516 A | 8/1995 | Michlin et al. | 355/200 |
| 5,464,243 A | 11/1995 | Maiwald et al. | 280/638 |
| 5,547,104 A | 8/1996 | Parker | 220/772 |
| 5,564,586 A | 10/1996 | Goodwin | 220/343 |
| 5,568,671 A | 10/1996 | Harris et al. | 16/18 R |
| 5,582,322 A | 12/1996 | Prout et al. | 220/771 |
| 5,802,693 A | 9/1998 | Lee | 29/416 |
| 5,947,795 A | 9/1999 | Cohen | 446/469 |
| 5,950,971 A | 9/1999 | Koumbis et al. | 248/200 |
| 6,012,709 A | 1/2000 | Meatto et al. | 267/36.1 |
| 6,325,962 B1 * | 12/2001 | Kmiecik et al. | 264/523 |

* cited by examiner

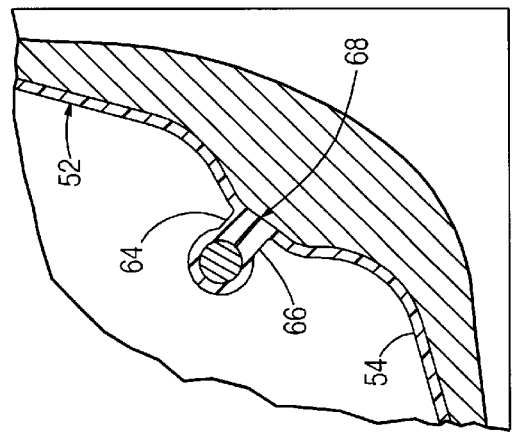
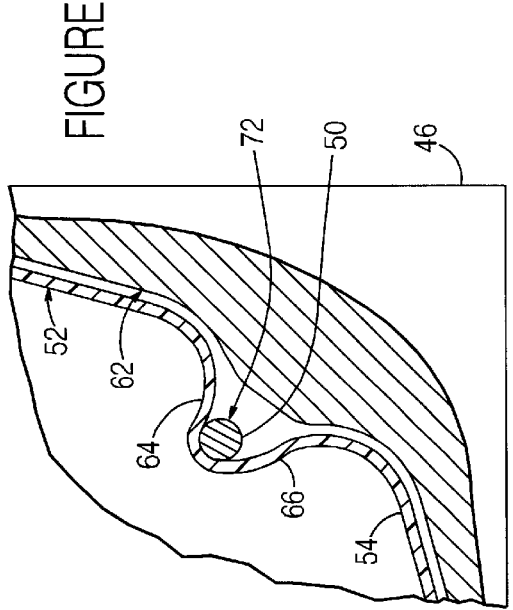
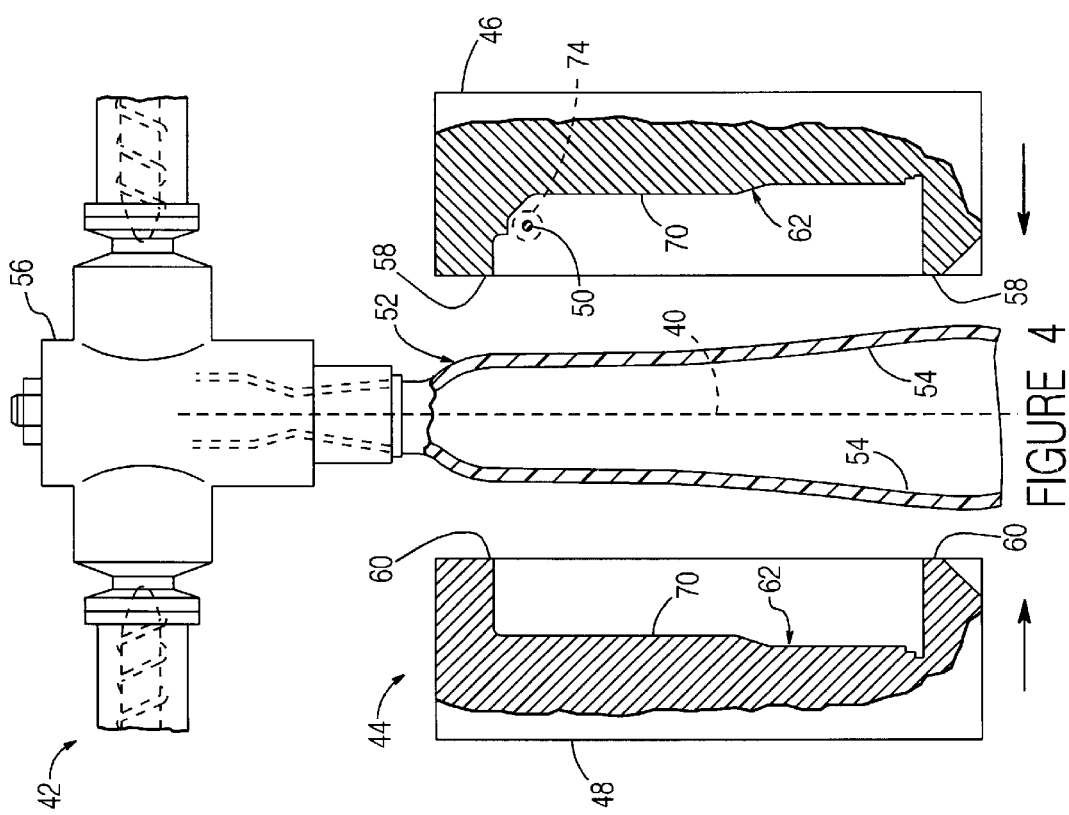

ENCLOSED AREA ON A BLOW MOLDED ARTICLE AND METHOD OF MAKING THE SAME

FIELD OF THE INVENTION

The present invention relates to an enclosed area on a blow molded article and method of making the same.

BACKGROUND OF THE INVENTION

It is generally known to provide a molded article that has a pair of cavities, with one cavity that is not parallel to the other cavity (e.g., configured to receive and secure a member or another part). Such non-parallel cavities are typically apertures cut into a container, a separate piece (e.g., a bracket), or a "C"—shaped recess that is intended to provide a snap-fit structure. An example of such known molded articles is a blow molded container or refuse container having wheels mounted to an axle inserted in the non-parallel cavity. Another such molded article may be a blow molded storage enclosure, such as a shed, bin, etc. that typically include a hinge mounted (e.g., fastened, inserted into a dovetail groove, etc.) to a non-parallel cavity on the storage enclosure and/or a lid or cover.

However, blow molded articles having cavities that are non-parallel to the main cavity may present disadvantages, such as failure to perform their intended purpose (e.g., an axle or other member is not securely held in a cavity as desired), additional parts are required, restrictive tolerances or undue precision is required for assembly and installation of supplemental parts, cost and time burden in assembly, overall configurations that tend to show visual defects or imperfections, the costs of skilled labor, inspection and occasional repair or quality control during and after assembly or installation, etc.

To provide an inexpensive, reliable and widely adaptable technique of providing an enclosed area that is not parallel to a main cavity in a blow molded article to avoid the above-referenced and other problems would represent a significant advance in the art. Accordingly, it would be advantageous to provide a blow molded article having an integrally molded wall that provides a cavity or enclosed area. It would also be advantageous to provide a blow molded article that is constructed of fewer components and/or fabricated from fewer parts (e.g., integrally molded or machined). It would further be advantageous to provide a refuse container having an integrally molded bore configured to receive and support an axle. It would be desirable to provide for an enclosed area on a blow molded article and a method of making the same having one or more of these or other advantageous features.

SUMMARY

How these and other advantages and features of the present invention are accomplished, individually, collectively or in various subcombinations, is described in the following detailed description of the preferred and other exemplary embodiments, taken in conjunction with the drawings. Generally, however, they may be accomplished in a method of making a blow molded article comprising supplying a preform to a mold having a first cavity and a second cavity, the first cavity having a pin, closing the mold, supplying a fluid to the closed mold, expanding a first portion and a second portion of the preform around the pin, and contacting the first portion and the second portion to provide an enclosure.

These and other features of the present invention may also be accomplished in a method of making a blow molded article. The method comprises supplying a preform to a mold having a first mold cavity and a second mold cavity, the first cavity having a pin, closing the mold and sealing the preform, supplying a fluid to the preform, expanding the preform so that a first portion and a second portion of the preform expand around the pin, contacting and joining the first portion and the second portion to provide an enclosure, and removing the pin from the enclosure.

These and other features of the present invention may further be accomplished in a blow molded article. The blow molded article includes a body defining a cavity, and a wall integrally-formed with the body and providing an enclosure.

These and other features of the present invention may further be accomplished in a refuse container formed by blow molding. The refuse container comprises a body defining a cavity having a first axis, a wall defining an enclosure integrally formed with the body and having a second axis which is non-parallel to the first axis, an axle disposed in the enclosed area, and a pair of wheels coupled to the axle.

The present invention further relates to various features and combinations of features shown and described in the disclosed embodiments. Other ways in which the objects of the present invention are accomplished will be described in the following specification or will become apparent to those skilled in the art after they have read this specification. Such other ways are deemed to fall within the scope of the present invention if they fall within the scope of the claims which follow.

DESCRIPTION OF THE FIGURES

FIG. 4 is a schematic section view of a blow molding apparatus in an open condition and a partly extruded preform according to an exemplary embodiment.

FIG. 5 is a schematic section view of the blow molding apparatus of FIG. 4 in a closed condition.

FIG. 6 is a fragmentary schematic section view of the mold as the preform expands and stretches around a core pin.

DETAILED DESCRIPTION OF PREFERRED AND OTHER EXEMPLARY EMBODIMENTS

Before proceeding to the detailed description of the preferred and exemplary embodiment, several comments can be made about the general applicability and the scope thereof.

First, construction and operation of the molding apparatus described in this specification may be used with a wide variety of blow molded articles (e.g., containers, panels, sub-parts, storage enclosures, tanks (e.g., septic tank), etc.) in addition to the refuse container specifically illustrated. The enclosure or enclosed area may have any of a variety of applications for other articles that employ a recess, notch, hole, aperture, bore, or the like feature (or otherwise provides for engagement of an item to the blow molded article (e.g., hinge, accessories, and the like). It is also important to note that the term "container," "cavity," and "enclosed area" are intended to be broad terms and not terms of limitation.

Second, the particular materials used to construct the illustrated embodiments are also illustrative. For example, as will be appreciated by those familiar with the art, the refuse container components can be made from any of a variety of plastic resins, such as polypropylene, polyethylene, acrylonitrile butadiene styrene ("ABS"), any of a variety of homopolymer plastics, copolymer plastics, plastics with special additives, filled plastics, etc., and a variety of other materials known to those familiar with the art.

Further, the preferred and exemplary embodiments are illustrated with the enclosure being generally perpendicular to the main cavity of the container, and located on the bottom portion near the edge of the container. Alternative embodiments may be constructed with any of a variety of enclosed area orientations according to the desired configuration of the molded article, core pin performance, enclosed area purpose, or manufacturing considerations. Also, the enclosed area shown in the illustrated embodiments is generally circular in plan view, but may be elliptical, square, rectangular, multi-sided, or any other shape.

Figure 1:
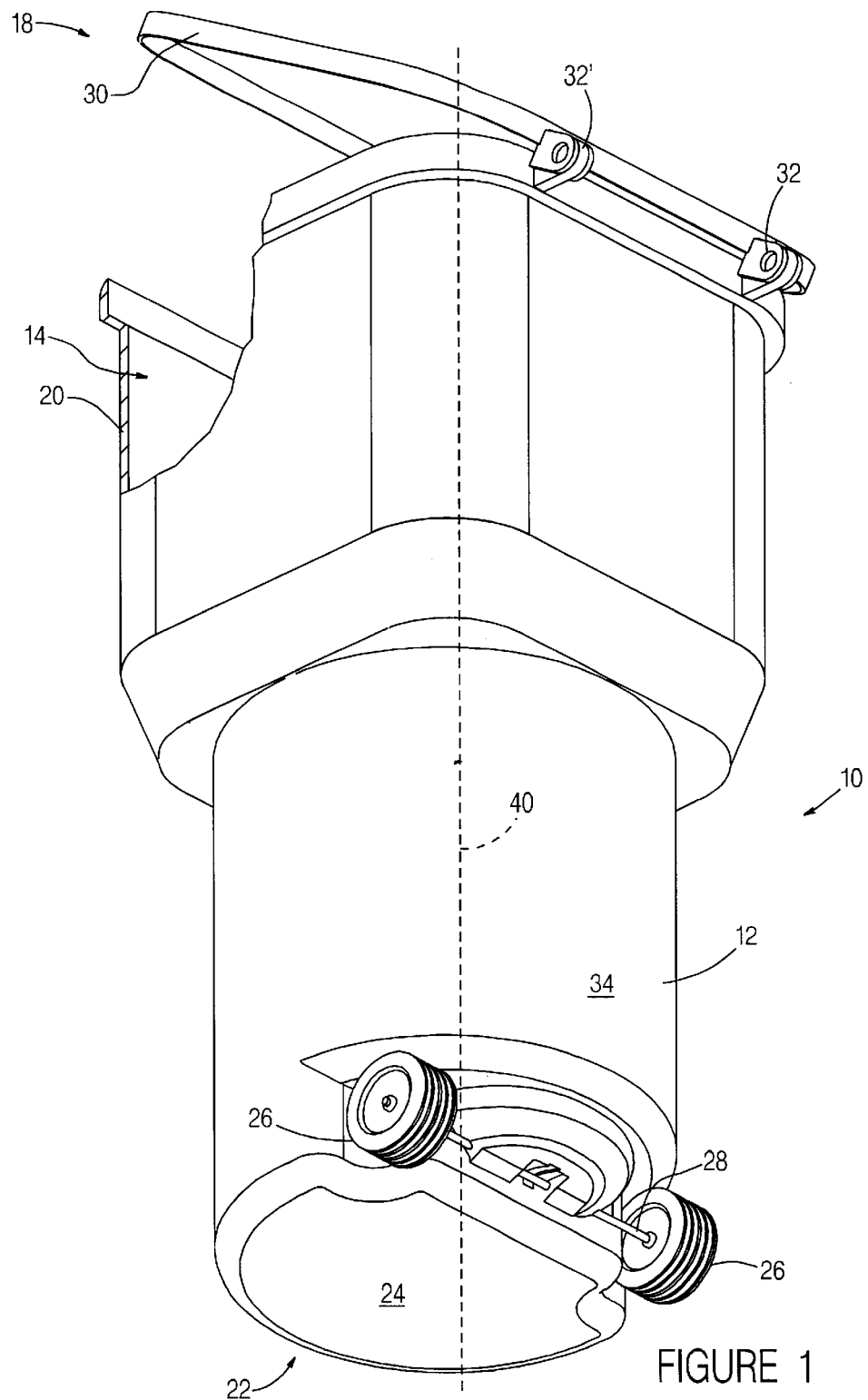
FIG. 1 is a perspective view of a refuse container according to a preferred embodiment.

Proceeding now to descriptions of the preferred and exemplary embodiments. FIG. 1 shows a blow molded article (shown as a refuse container 10) according to a preferred embodiment. Container 10 includes a main body 12 defining a cavity 14 and a secondary cavity (shown as an enclosure or enclosed area 16). Body 12 of container 10 includes an open top 18 defined by a rim 20, and a closed bottom 22 defined by a bottom wall 24. Container 10 further includes wheels 26 mounted to an axle 28 and a lid 30 pivotably coupled to body 12 by a hinge 32. According to an exemplary embodiment, barrels of hinge 32 maybe integrally formed as described herein to provide another enclosed area configured to receive a hinge pin.

Figure 2:
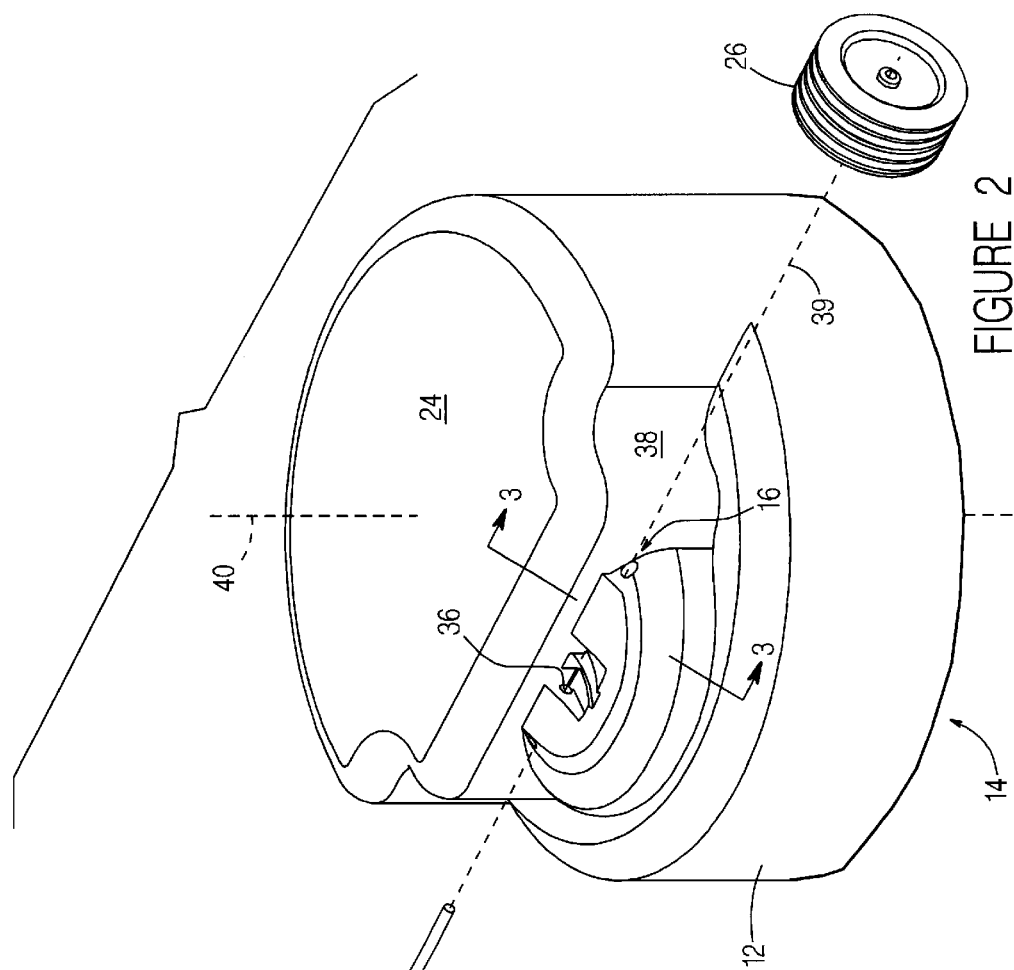
FIG. 2 is a fragmentary exploded-perspective view of the bottom portion of the refuse container of FIG. 1.
Figure 3:
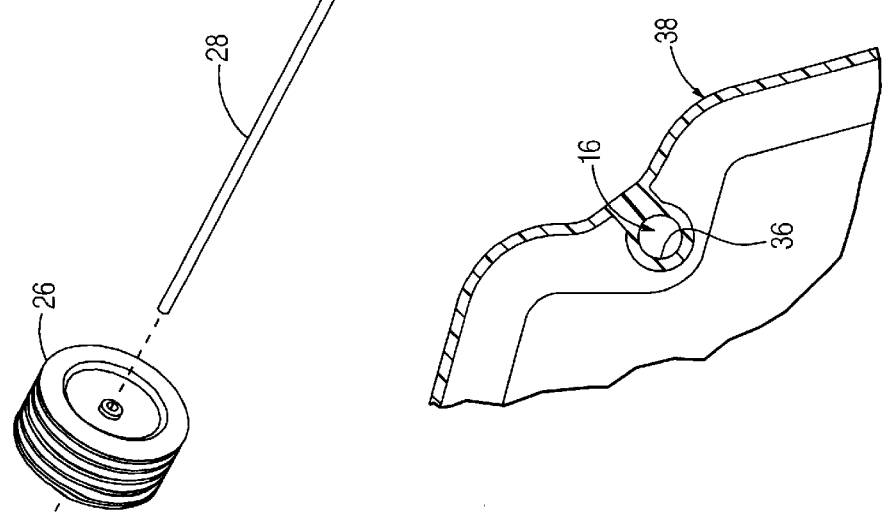
FIG. 3 is a section view of an enclosed area of the refuse container taken along line 3—3 of FIG. 2.

Enclosed area 16 may have any of a variety shapes, configurations, and orientations, and includes at least one end which is open to an exterior surface 34 of the blow molded article. As shown in FIGS. 2 and 3, enclosed area 16 is a bore 36 that is open at both ends to an exterior surface 38 of body 12 of container 10. Bore 36 has an axis 39 is configured to receive and secure axle 28. Bore 36 is approximately perpendicular to an axis 40 of cavity 14. According to alternative embodiments, enclosed area 16 may have any of a variety of orientations relative to the blow molded article (e.g., parallel and non-parallel to the main cavity). Additionally, the enclosed area may be to be open to the exterior surface of the molded article at one or more places.

According to an exemplary embodiment, body 12 and bore 36 are formed by a blow molding operation. Referring to FIG. 4, the illustrated apparatus 42 includes a blow molding mold 44 having a pair of mold cavities 46, 48 and a core pin 50. Mold cavities 46, 48 are configured to provide shape and texture to the blow molded article. Mold cavities 46, 48 are moved between an open position (shown in FIG. 4) and a closed position (shown in FIG. 5).

Core pin 50 is configured to provide a desired shape and size of the enclosed area 16. According to a preferred embodiment, core pin 50 is slightly larger (e.g., oversized) than the desired dimensions of the finished enclosed area 16 to compensate for shrinkage upon cooling.

Core pin 50 may have any of a variety of shapes, configurations, sizes, and the like. The position of core pin 50 within mold cavities 46, 48 depends on such the shape, size, and configuration of the core pin 50. The distance between core pin 50 and the outer surface of mold cavity 46 and/or 48 is believed to be a function of one or more factors, such as the size and position of the core pin, temperature, pressure, parison material, and the like. According to an exemplary embodiment, the core pin is centered (along one or more axes) in the mold. According to a preferred embodiment, core pin 50 is spaced between about 1/16 inch and about 1 inch from mold cavity 46 and/or 48 for typical configurations of core pins that may be used. The cross-sectional area and/or dimensions may be any of a variety of amounts, depending on one or more factors such as the material, size of the blow molded article, distance from wall of mold cavity, and the like. According to an exemplary embodiment, the core pin may be up to about 8 inches in diameter (e.g., for some tanks, or the like). According to another exemplary embodiment, the core pin may be between 1/16 inch and about 1 inch. According to a particularly preferred embodiment, core pin 50 for forming bore 36 in refuse container shown in FIG. 1 is spaced about 1/8" from the edge of the mold cavity for a 5/16" axle. According to alternative embodiments, the core pin may be spaced any distance from mold cavity which does not cause failure of the inflation (e.g., tearing or rupturing of the parison).

During the molding operation, a preform 52 (or "parison") is supplied to mold 44 in the open position. Preform 52 includes a wall 54 and may be provided in any of a variety of configurations (e.g., planar, hollow, tubular shaped, etc.) depending on the desired blow molded article). For molding of container 10, preform 52 is provided by an extrusion machine 56. When preform 52 has reached a required length and/or position, mold 44 is closed, excess material is removed or detached (e.g., "squeezed" off by edges 58, 60 of mold cavities 46, 48) and preform 52 is "sealed" so that the preform is closed by the formation of a weld or seam. A fluid is supplied (i.e., injected or blown) into the preform 52, expanding preform 52 within the mold 44 and against mold cavities 46, 48. As preform 52 expands against mold cavities 46, 48, preform 52 adopts the configuration defined by the mold cavities 46, 48. The fluid may be any of a variety of known fluids, such as air, carbon dioxide, liquids, gases, etc. that may be stored under pressure and injected into preform 52.

Referring to FIGS. 5 and 6, as preform 52 expands, it contacts surface 62 of mold cavities 46, 48. As preform 52 expands and contacts core pin 50, preform 52 stretches to conform to the shape of core pin 50 (e.g., a cylindrical member). Preform 52 continues to stretch until two portions 64, 66 of preform 52 contact and join to form a weld 68 as preform 52 solidifies upon cooling.

During the molding process, air is evacuated as preform 52 is "inflated." Preferably, air is evacuated through vents 70 disposed about mold 44. According to an exemplary embodiment, core pin 50 includes one or more vents 72 configured to evacuate air from around core pin 52 which may become trapped as portions 64, 66 of preform 52 joins to form weld 68.

After preform has been satisfactorily expanded, core pin 50 is removed from the enclosed area 16 of blow molded article. According to a preferred embodiment, core pin 50 is retracted by an actuation device 74 (e.g., pneumatic, hydraulic, cam-actuated, mechanical, electro mechanical, etc.) mounted to mold cavity 46, 48 prior to mold cavities 46, 48 being opened and the blow molded article removed. Actuation cylinder 74 is configured to move core pin 50 between and extended position and a retracted position.

According to an alternative embodiment, core pin 50 may be manually removed from the blow molded article (e.g., before or after the mold cavities 46, 48 have been opened). In yet another embodiment, core pin 50 may be left in enclosed area 16 of blow molded article and used in the finished product (e.g., as axle 28 of refuse container 10). Another "core pin" is then positioned in the mold cavities in preparation of the next molding cycle.

It is also important to note that the construction and arrangement of the elements of the encapsulated axle and method of making the same as shown in the preferred and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, the container may be any of a variety of blow molded articles. Also, the enclosed area may have any of a variety of shapes, sizes, orientations, and configurations. Further, the preform may be provided in any of a variety of conventional formats (hollow, tubular, sheet, etc.) such that forming of the enclosed area may similarly be accomplished. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the present inventions as expressed in the appended claims.

What is claimed is:

1. A method of making a blow molded article, the method comprising:

supplying a preform to a mold having a first cavity and a second cavity, the first cavity having a pin;

closing the mold;

supplying a fluid to the closed mold;

expanding a first portion and a second portion of the preform around the pin;

contacting the first portion and the second portion to provide an enclosure that circumferentially surrounds at least a portion of the pin within the first cavity.

2. The method of claim 1, further including an actuation device configured to retract the pin.

3. The method of claim 2 wherein the actuation device is a mechanical actuation apparatus.

4. The method of claim 1 wherein the mold includes one or more vents.

5. The method of claim 1 wherein the pin includes one or more vents.

6. The method of claim 1 wherein the blow molded article is a refuse container.

7. A method of making a blow molded article, the method comprising:

supplying a preform to a mold having a first cavity and a second cavity, the first cavity having a pin;

closing the mold;

supplying a fluid to the closed mold;

expanding a first portion and a second portion of the preform around the pin; and contacting the first portion and the second portion to provide an enclosure wherein the pin remains disposed in the enclosure.

8. A method of making a blow molded article, the method comprising:

supplying a preform to a mold having a first cavity and a second cavity, the first cavity having a pin;

closing the mold;

supplying a fluid to the closed mold;

expanding a first portion and a second portion of the preform around the pin; and contacting the first portion and the second portion to provide an enclosure;

wherein the pin is approximately centered in the mold.

9. The method of claim 8 wherein the pin is spaced from a surface of the first cavity between about 1/16 inch and about 1 inch.

10. A method of making a blow molded article, the method comprising:

supplying a preform to a mold having a first cavity and a second cavity, the first cavity having a pin;

closing the mold;

supplying a fluid to the closed mold;

expanding a first portion and a second portion of the preform around the pin; and contacting the first portion and the second portion to provide an enclosure;

wherein the pin is cylindrical and has a diameter of up to 8 inches.

11. A method of making a blow molded article, the method comprising:

supplying a preform to a mold having a first mold cavity and a second mold cavity, the first cavity having a pin;

closing the mold and sealing the preform;

supplying a fluid to the preform;

expanding the preform so that a first portion and a second portion of the preform expand around the pin;

contacting and joining the first portion and the second portion to provide an enclosure; and removing the pin from the enclosure;

wherein the pin is removed from the enclosure by an actuation device to move the pin between an extended position and a retracted position.

12. The method of claim 11 wherein the actuation is an electro-mechanical actuation apparatus.

13. The method of claim 11 wherein the enclosure is a bore.

* * * * *